No. 844,275. PATENTED FEB. 12, 1907.
C. F. FLEMING.
DRIED FRUIT PACKING DEVICE.
APPLICATION FILED SEPT. 17, 1906.

WITNESSES:
Frederick E. Maynard.

INVENTOR
Charles F. Fleming,
BY
Geo. H. Strong.
ATTORNEY

UNITED STATES PATENT OFFICE.

CHARLES F. FLEMING, OF SAN JOSE, CALIFORNIA.

DRIED-FRUIT-PACKING DEVICE.

No. 844,275.      Specification of Letters Patent.      Patented Feb. 12, 1907.

Application filed September 17, 1906. Serial No. 334,978.

*To all whom it may concern:*

Be it known that I, CHARLES F. FLEMING, a citizen of the United States, residing at San Jose, in the county of Santa Clara and State of California, have invented new and useful Improvements in Dried-Fruit-Packing Devices, of which the following is a specification.

My invention relates to a means for symmetrically facing packages of dried fruit so that the upper surface will present an attractive appearance to purchasers.

It consists in the combination, with the box or package, of a means for symmetrically spacing the fruit and in details of construction, which will be more fully explained by reference to the accompanying drawings, in which—

Figure 1:
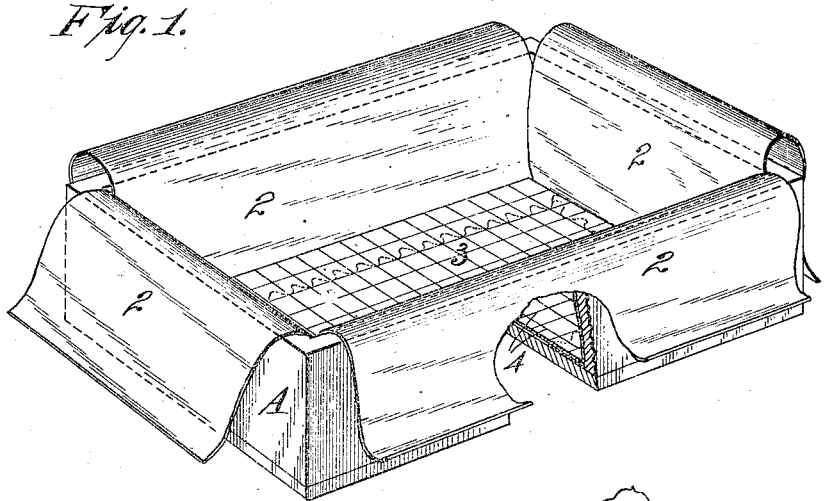
Figure 2:
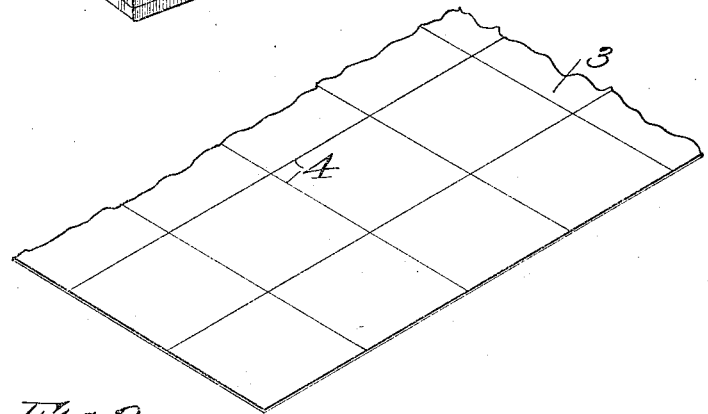

Figure 1 is a perspective view of the box. Fig. 2 is a similar view of the ruled paper.

In packing dried fruits the boxes are made with the sides, ends, and top secured together, and the bottom is left open, and the fruit is packed into the boxes while the latter are inverted. The object of this is to make the first layer of fruit, which subsequently becomes the top, symmetrical and attractive to the user when the box is finally opened for use.

The box sides A form a parallelogram of any suitable or desired size, dependent upon the quantity of fruit to be packed in each box. These boxes are provided with a lining-paper 2, the upper edges of which are usually made ornamental and adapted to fold over the top of the fruit. A sheet of paraffin or other equivalently-coated paper 3 is laid into the inverted box, and this forms a protection for the ornamental paper and a covering for the top of the fruit when the box has been filled.

It is customary to place fine-looking fruit in lines longitudinally and transversely to form the top layer in packing, and the box is afterward filled, the bottom nailed on, and the box then turned right side up. It will be seen that it is difficult for any one, and especially the inexperienced help which is obtainable during the packing season, to accurately place the rows forming the first layer so that they will evenly fill the length and width of the box.

It is the object of my invention to provide a guide whereby the fruit can be accurately placed by the most inexperienced person. This consists of the sheet of paraffin, waxed, or equivalent paper having lines 4 printed longitudinally and transversely across it. The box, with its cover secured in place and the bottom left off, is placed with the top down. The usual lining-papers are placed in the box and the waxed paper is then laid in. The lines on this sheet form equally-sized squares of such size that each square will receive one article of fruit, which is thumbed or pressed down in the square, and the full squares just occupy the length and breadth of the box, so that when an article of fruit has been properly placed on each square they will be symmetrically arranged and will just fill the length and breadth of the box. The remainder of the box being then filled, the bottom is secured and the package is completed, ready for shipment or sale. As the waxed paper is translucent, it will be manifest that a separate ruled sheet may be placed beneath a plain waxed sheet, and the lines of the squares being visible through the waxed sheet will serve as a guide for placing the fruit.

Having thus described my invention, what I claim, and desire to secure by Letters Patent, is—

1. The combination with a box or package for containing dried fruit, of a flexible translucent sheet fitting within the box, said sheet having longitudinal and transverse lines imprinted thereon and forming a series of symmetrical guiding-squares for the reception of a layer of fruit.

2. The combination with a fruit-package of a symmetrically-subdivided paraffin guide and cover sheet fitting within the box and forming a surface to receive a primary layer of fruit.

3. A guide for symmetrically placing a primary layer of fruit within the containing-package, said guide consisting of a sheet of paper having longitudinal and transverse lines forming symmetrical rectangles upon its surface, said sheet substantially fitting the interior of the package.

In testimony whereof I have hereunto set my hand in presence of two subscribing witnesses.

CHARLES F. FLEMING.

Witnesses:
    E. M. FULLER,
    E M. GOSS.